United States Patent
Kosugi

(10) Patent No.: US 6,223,197 B1
(45) Date of Patent: *Apr. 24, 2001

(54) CONSTANT MULTIPLIER, METHOD AND DEVICE FOR AUTOMATICALLY PROVIDING CONSTANT MULTIPLIER AND STORAGE MEDIUM STORING CONSTANT MULTIPLIER AUTOMATIC PROVIDING PROGRAM

(75) Inventor: Kazuyuki Kosugi, Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/916,414

(22) Filed: Aug. 22, 1997

(30) Foreign Application Priority Data

Aug. 26, 1996 (JP) .................................................. 8-223352
Jun. 20, 1997 (JP) .................................................. 9-163915

(51) Int. Cl.$^7$ ...................................................... G06F 7/52
(52) U.S. Cl. ........................................ 708/620; 395/500.03
(58) Field of Search ........................... 364/754.01, 757, 364/760.01; 708/620, 625, 628; 395/500.02, 500.03, 500.23

(56) References Cited

U.S. PATENT DOCUMENTS 5,600,569 * 2/1997 Nishiyama et al. ................. 364/757
5,903,470 * 5/1999 Miyoshi et al. ..................... 708/620

FOREIGN PATENT DOCUMENTS 5-27987   2/1993 (JP) .

* cited by examiner

Primary Examiner—Tan V. Mai
(74) Attorney, Agent, or Firm—Staas & Halsey

(57) ABSTRACT

A constant multiplier reduces the number of partial products and thereby reduces the number of adding stages for a constant. By reducing the number of partial products, the constant multiplier reduces circuit area and operation delay. The constant multiplier is optionally incorporated into a corresponding method and a device which automatically provides the constant multiplier. The constant multiplier includes an adding/subtracting circuit, which has an adder and inverter, for performing addition and subtraction of partial products. Each of the partial products is obtained by multiplying each of "add" and "subtract" terms of a power of two having a smallest term number obtained by decomposing the constant by a signal. The constant multiplier is suitably used for designing a large scale integrated circuit (ASIC) having functions of a moving picture expert group (MPEG).

10 Claims, 13 Drawing Sheets

```
        a a a a a a    ---- SIGNAL
      X 1 1 1 0 1 1    ---- CONSTANT
    ─────────────────
      a a a a a a      ①
    - a a a a a a      ②  PARTIAL PRODUCTS
    - a a a a a a      ③
    ─────────────────
    X X X X X X X X X X X
```

```
              A        ---- SIGNAL
      X 1 1 1 0 1 1    ---- CONSTANT
    ─────────────────
            64 A       ①
            -4 A       ②  PARTIAL PRODUCTS
    +         -A       ③
    ─────────────────
            59 A
```

FIG. 8(A)

```
                        a a a a a a    ---- SIGNAL
EXPANDED CODE BITS    x 1 1 1 0 1 1    ---- CONSTANT
                                            (59)
      ┌─────────────┐
      │s s s s s s s│ā ā ā ā ā ā       ---- ③ - A
      │s s s s s└──┬┘ā ā ā ā ā       1 ---- ② - 4A
   +) │s└──────────┘a a a a a        1 ---- ① 64A
      └─┘
      x x x x x x x x x x x x
```

```
                         a a a a a a
DELETED BITS           x 1 1 1 0 1 1
        ┌───────────┐
        │□ □ □ □ □ □│s̄ ā ā ā ā ā
        │□ □ □ □    │s̄ ā ā ā ā ā    1
        └───────────┘
         s̄ a a a a a              1
         1 1 1   1
     +)                            1
         x x x x x x x x x x x x
```

```
      a a a a a a
    × 1 1 1 0 1 1
    ─────────────
      a a a a a a   ①  ⎫
       a a a a a    ②  ⎪
      0 0 0 0 0 0   ③  ⎬ PARTIAL
       a a a a a    ④  ⎪ PRODUCTS
      a a a a a     ⑤  ⎪
  +  a a a a a      ⑥  ⎭
    ─────────────
  x x x x x x x x x x
```

```
          A
       × 1 1 1 0 1 1
       ─────────────
            A       ①  ⎫
           2A       ②  ⎪
            0       ③  ⎬ PARTIAL
           8A       ④  ⎪ PRODUCTS
          16A       ⑤  ⎪
       +  32A       ⑥  ⎭
       ─────────────
          59A
```

A × 59 = 59 × A
     = A + 2A + 0 + 8A + 16A + 52A

CONSTANT MULTIPLIER, METHOD AND DEVICE FOR AUTOMATICALLY PROVIDING CONSTANT MULTIPLIER AND STORAGE MEDIUM STORING CONSTANT MULTIPLIER AUTOMATIC PROVIDING PROGRAM

BACKGROUND OF THE INVENTION

1. Field of the Invention

The present invention relates to a constant multiplier for multiplying a constant by a signal set to an optional value, a method and a device for automatically providing such a constant multiplier and a storage medium storing a program used for automatically providing such a constant multiplier.

2. Description of the Related Art

Generally, a large scale application specific integrated circuit (ASIC) having functions of a moving picture expert group (MPEG), and so on, needs a number of multipliers each as an arithmetic circuit for performing image processing or the like. Most of these multipliers multiply constants (already known fixed numbers) by signals having unknown optional values.

For example, multiplication of a constant by a signal is often used for discrete cosine/color space transformation. Specifically, in a RGB code/YUV code conversion expression like that described below, U and V are signals having unknown optional values and parameters (coefficients) multiplied by these signals U and V are constants.

$$R = Y + 1.367 \times V$$

$$G = Y - 0.703125 \times U - 0.34375 \times V$$

$$B = Y + 1.7345 \times U$$

Conventionally, multipliers for multiplying constants by signals like those described above have been designed not as special multipliers for the constants but as multipliers for multiplying unknown optional values by each other. In other words, multiplication of a constant by a signal is performed by a multiplier operated based on the same algorithm as that for performing multiplication of a signal by another signal.

It can thus be understood that conventionally, for designing of a large scale integrated circuit, even if a value for one of signals to be multiplied by each other is fixed and known beforehand, the signal (constant) has been treated as a signal having an unknown value and no optimization has been carried out for a circuit as a constituting element for the multiplier.

Consequently, in the large scale integrated circuit (e.g., LSI for MPEG) having a number of useless circuit portions and a number of multipliers for multiplying constants by signals, if a multiplier like that described above is formed, not only an area for the circuit is increased but also operational delay is caused to occur.

For example, a multiplier designed by using a shift multiplier method treats a multiplier B which is a constant as a signal and produces a partial product from a product with a multiplicand A for each figure (bit), and the partial products thus obtained for respective bits are shifted each by 1 bit and added together. Specifically, with A="1101" and B="1011", calculation is performed in a manner described below.

```
      1101    Multiplicand (A: signal)
   x  1011    Multiplier    (B: constant)

1101    Partial product ①    (A)
      1101    Partial product ②    (2A)
      0000    Partial product ③    (0)
    + 1101    Partial product ④    (8A)

10001111    Multiplication result
```

In the above example, since the partial product ③ is 0, this product need not be added in actuality. However, if a multiplier for multiplying a signal by another signal is used, the partial product ③ is also added and accordingly an unnecessary circuit (adder) is provided.

Next, the circuitry example of the multiplier designed by producing partial products with the shift multiplier method will be described by referring to FIGS. 11 and 12.

Referring first to FIG. 11, there are shown a multiplication processing procedure and a constitutional example of a multiplier. It is assumed that as a multiplier, for instance a constant "59 [=(111011)$_2$; 6 bits ]" is given and a multiplicand is a signal A. In this case, if partial products are to be produced by using the above-noted shift multiplier method, six partial products ⑥ 32A, ⑤ 16A, ④ 8A, ③ 0A, ② 2A and ① A are obtained. A partial product adding circuit, in other words a multiplier 100, for calculating a multiplication result "59A" with the signal A by adding these products together to output it, is then provided.

The multiplier 100 shown in FIG. 11 is constructed in a manner that five carry save adders (abbreviated to CSA, hereinafter) 101 to 105 are connected together and a carry look-ahead adder (abbreviated to CLA, hereinafter) 106 which is a typical high-speed type carry propagate adder (abbreviated to CPA, hereinafter) is connected to a stage next to the CSA 105 as a last stage. For an adder used in the last stage, any type may be used as long as it belongs to CPA. For example, a carry select adder or a ripple carry adder other than CLA can be used.

In the multiplier constructed in the above-noted manner, multiplication processing is performed as follows. The partial products ⑥, ⑤, ④, ③, ② and ① are regularly added together in sequence by the five CSAs 101 to 105, carried values are propagated at a high speed and added together by the CLA 106 in the last stage and then a multiplication result "59A" is outputted. In the multiplier 100 shown in FIG. 11, the number of adding stages excluding the last stage is "5".

However, since the multiplier 100 is designed without making any determination as to whether the partial product is "0" or not, the CSA 103 for adding the partial product ③ which is "0" must be provided. Consequently, a circuit area is increased and operational delay is caused to occur.

Referring next to FIG. 12, there is shown a procedure for designing a constant multiplier and a constitutional example thereof. A multiplier 200 shown in FIG. 12 produces six partial products ① to ⑥ by using the same shift multiplier method as that shown in FIG. 11, adds these six partial products ⑥, ⑤, ④, ③, ② and ① together and thereby calculates a multiplication result "59A". In this case, the multiplier 200 comprises four CSAs 201 to 204 interconnected in a tree form so as to reduce the number of adding stages and a CPA 205 connected to a stage next to the CSA 204 as a last stage. In other words, the constant multiplier 200 having adding stages amounting in number to "3" is provided/designed by the four CSAs 201 to 204. This tree-formed adder construction is called "Wallace tree". For the CPA 205, a CLA or a carry select adder can be used.

With the multiplier 200 provided/designed in the above-noted manner, since the number of adding stages can be reduced compared with the case of the multiplier 100 shown in FIG. 11 and the number of CSAs to be used can also be reduced, the problems of an increased circuit area and operational delay may be solved to a certain extent. However, the number of adding stages and the number of used adders should preferably be reduced much more.

Referring further to FIG. 13, there is shown another constitutional example of a multiplier. A multiplier 300 shown in FIG. 13 comprises a partial product generation circuit, which includes a booth decoder 301 and a booth selector 302. By using this partial product generation circuit, the number of partial products can be reduced by half. Accordingly, when a constant "59" is to be multiplied by a signal A as described above, the number of partial products is reduced from six to three, the three partial products ① to ③ are added together by an adding circuit (by "Wallace tree" or CSA) 303 and a CLA 304 in the last stage and then a multiplication result "59A" is calculated.

With the multiplier 300 constructed in the above-noted manner, since the booth decoder 301 and the booth selector 302 are formed, extra hardware must be provided. Consequently, the problems of an increased circuit area and operational delay cannot be solved.

SUMMARY OF THE INVENTION

The present invention was made in order to solve the problems discussed above. It is an object of the present invention to provide a constant multiplier for multiplying two values, a constant and a signal, whereby the number of partial products (the number of adding stages) based on the constant is reduced and a circuit area and operational delaying time are reduced, a method and a device for automatically providing/designing such a constant multiplier and a storage medium for storing a constant multiplier automatic providing program.

In order to achieve the above-described object, according to an aspect of the present invention, there is provided a constant multiplier for multiplying a constant by a signal set to an optional value, which comprises an adding/subtracting circuit for adding or subtracting all partial products obtained by performing multiplication by a signal to or from each of the add/subtract terms of a power of 2 having a smallest term number obtained by decomposing a constant.

With the constant multiplier of the present invention constructed in the above-noted manner, a constant as a multiplier is decomposed into the add/subtract terms of a power of 2 having a smallest term number, addition/subtraction is performed for all partial products obtained by multiplying each of the add/subtract terms by a signal as a multiplicand by the adding/subtracting circuit and thereby a multiplication result between the constant and the signal is obtained. Accordingly, the number of adding stages in the constant multiplier and the number of used multipliers can be reduced each to a minimum.

In this case, the adding/subtracting circuit may include a first adding circuit for adding together all the absolute values of the partial products obtained by multiplying the subtract terms included in the above-noted add/subtract terms each by a signal, an inversion circuit for inverting a value added by the first adding circuit and a second adding circuit for adding together the value inverted by the inversion circuit and the partial products obtained by multiplying the add terms included in the above-noted add/subtract terms each by the signal.

In this case, multiplication processing is performed as follows. The absolute values of the partial products for all the subtract terms are first added together by the first adding circuit, then a result obtained by inverting the result of this addition with the inversion circuit and the partial products for the add terms are added together by the second adding circuit and thereby a multiplication result between the constant and the signal is obtained. In other words, the subtract terms of the constant are bracketed and subtraction is performed by the inversion circuit and the second adding circuit after the partial products (absolute values) in the bracket are added together by the first adding circuit. Accordingly, it is not necessary to provide a subtracting function (inversion circuit) for each subtract term.

According to another aspect of the present invention, there is provided a method for automatically providing a constant multiplier which multiplies a constant I by a signal set to an optional value. This constant multiplier automatic providing method comprises a constant decomposing step of decomposing the constant I into the add/subtract terms of a power of 2 having a smallest term number, a partial product producing step of producing a partial product by multiplying each of the add/subtract terms obtained by the constant decomposing step by a signal and a circuit providing step of providing an adding/subtracting circuit for performing addition/subtraction for all partial products obtained by the partial product producing step as a constant multiplier.

The constant decomposing step includes a first step of obtaining a natural number n satisfying $2^{n-1} < I < 2^n$ for the constant I, a second step of obtaining natural numbers a and b satisfying $I = 2^{n-1} + a$ (expression (1)) and $I = 2^n - b$ (expression (2)) based on the natural number n obtained in the first step, a third step of determining the relationship of size between the natural numbers a and b obtained in the second step, a fourth step of selecting the expression (1) when the relationship of a<b is determined in the third step and then setting the natural number a as the constant I in the first step and a fifth step of selecting the expression (2) when the relationship of a>b is determined in the third step and then setting the natural number b as the constant I in the first step. The first to fifth steps are repeated until the constant I in the first step becomes a power of 2.

The circuit providing step may provide, as an adding/subtracting circuit, a first adding circuit for adding together all the absolute values of partial products obtained by multiplying the subtract terms included in the above-noted add/subtract terms each by a signal, an inversion circuit for inverting a value added by the first adding circuit and a second adding circuit for adding together a value inverted by the inversion circuit and partial products obtained by multiplying the add terms included in the above-noted add/subtract terms each by a signal.

According to yet another aspect of the present invention, there is provided a device for automatically providing a constant multiplier which multiplies a constant I by a signal set to an optional value. This constant multiplier automatic providing device comprises a constant decomposing unit for decomposing the constant I into the add/subtract terms of a power of 2 having a smallest term number, a register for storing the add/subtract terms obtained by the constant decomposing unit, a partial product producing unit for producing a partial product by multiplying each of the add/subtract terms stored in the register by a signal and a circuit providing unit for providing an adding/subtracting circuit for performing addition/subtraction for all partial products obtained by the partial product producing unit as a constant multiplier.

The constant decomposing unit includes a first arithmetic unit for calculating a natural number n satisfying $2^{n-1} < I < 2^n$ for the constant I, a second arithmetic unit for calculating natural numbers a and b satisfying $I=2^{n-1}+a$ (expression (1)) and $I=2^n-b$ (expression (2)) based on the natural number n calculated by the first arithmetic unit, a determining unit for determining the relationship of size between the natural numbers a and b calculated by the second arithmetic unit, a first add/subtract term setting unit for selecting the expression (1) when the relationship of a<b is determined by the determining unit, setting $2^{n-1}$ in the register and also adding/subtracting information regarding the current term $2^{n-1}$ in the same according to adding/subtracting information regarding a previous term and then setting the natural number a as the constant I in the first arithmetic unit, and a second add/subtract term setting unit for selecting the expression (2) when the relationship of a>b is determined by the determining unit, setting $2^n$ in the register and also adding/subtracting information regarding the current term 2n in the same according to adding/subtracting information regarding a previous term and then setting the natural number b as the constant I in the first arithmetic unit. The operations of the first and second arithmetic units, the determining unit and the first and second add/subtract term setting units are repeatedly executed until the constant I becomes a power of 2 in the first arithmetic unit.

The circuit providing unit may provide, as an adding/subtracting circuit, a first adding circuit for adding together all the absolute values of partial products obtained by multiplying the subtract terms included in the above-noted add/subtract terms each by a signal, an inversion circuit for inverting a value added by the first adding circuit and a second adding circuit for adding together a value inverted by the inversion circuit and partial products obtained by multiplying the add terms included in the above-noted add/subtract terms each by a signal.

According to yet further aspect of the present invention, there is provided a storage medium storing a constant multiplier automatic providing program. This storage medium is designed to automatically provide a constant multiplier for multiplying a constant I by a signal set to an optional value by a computer. The stored constant multiplier automatic providing program causes the computer to function as constant decomposing means for decomposing the constant I into the add/subtract terms of a power of 2 having a smallest term number and storing the add/subtract terms in a register, partial product producing means for producing a partial product by multiplying each of the add/subtract terms stored in the register by a signal and circuit providing means for providing an adding/subtracting circuit for performing addition/subtraction for all partial products obtained by the partial product producing means.

In this case, in order to cause the computer to function as a constant decomposing unit, based on the constant multiplier automatic providing program, the computer is operated as first arithmetic means for calculating a natural number n satisfying $2^{n-1} < I < 2^n$ for the constant I, second arithmetic means for calculating natural numbers a and b satisfying $I=2^{n-1}+a$ (expression (1)) and $I=2^n-b$ (expression (2)) based on the natural number n calculated by the first arithmetic means, determining means for determining the relationship of size between the natural numbers a and b calculated by the second arithmetic means, first add/subtract term setting means for selecting the expression (1) when the relationship a<b is determined by the determining means, setting $2^{n-1}$ in the register and also adding/subtracting information regarding the current term $2^{n-1}$ in the same according to adding/subtracting information regarding a previous term and then setting the natural number a as the constant I in the first arithmetic means and second add/subtract term setting means for selecting the expression (2) when the relationship of a>b is determined by the determining means, setting $2^n$ in the register and also adding/subtracting information regarding the current term $2^n$ in the same according to adding/subtracting information regarding a previous term and then setting the natural number b as the constant I in the first arithmetic means. The computer is repeatedly operated as the first and second arithmetic means, the determining means and the first and second add/subtract term setting means until the constant I becomes a power of 2 in the first arithmetic means.

The circuit providing means may provide, as an adding/subtracting circuit, a first adding circuit for adding together all the absolute values of partial products obtained by multiplying the subtract terms included in the above-noted add/subtract terms each by a signal, an inversion circuit for inverting a value added by the first adding circuit and a second adding circuit for adding together a value inverted by the inversion circuit and partial products obtained by multiplying the add terms included in the above-noted add/subtract terms each by a signal.

With the method and the device for automatically providing a constant multiplier and the storage medium storing a constant multiplier automatic providing program which are provided by the present invention and constructed in the above-noted manners respectively, it is possible to automatically provide a constant multiplier, which multiplies a constant by a signal by the adding/subtracting circuit for performing addition/subtraction for all partial products obtained by multiplying each of the add/subtract terms of a power of 2 having a smallest term number in a decomposed constant by a signal.

As described above, according to the constant multiplier of the present invention, a constant as a multiplier is decomposed into the add/subtract terms of a power of 2 having a smallest term number, addition/subtraction is performed by the adding/subtracting circuit for all partial products obtained by multiplying each of the add/subtract terms by a signal as a multiplicand and thereby a multiplication result between the constant and the signal is obtained. Accordingly, the number of adding stages and the number of used adders can be reduced each to a minimum in the constant multiplier.

Thus, the present invention enables the constant multiplier to be miniaturized and a high speed to be attained for processing. When a large scale integrated circuit having a number of constant multipliers is to be designed, each constant multiplier can be constituted of elements amounting in number to a minimum according to a constant. Accordingly, areas occupied by the multipliers in the large scale integrated circuit can be greatly reduced, operational delay therein can be controlled and thereby a high speed can be attained for processing.

In addition, since subtraction is performed by using the inversion circuit and the second adding circuit after the subtract terms of the constant are bracketed and the partial products (absolute values) in the bracket are added together by the first adding circuit, it is not necessary to provide a subtracting function for each subtract term. Therefore, the multiplier can be further miniaturized and a processing speed can be increased more.

Furthermore, according to the method and the device for automatically providing a constant multiplier and the storage medium storing a constant multiplier automatic providing program, which are provided by the present invention, a constant multiplier for multiplying a constant by a signal can be automatically provided/designed by the adding/subtracting circuit for performing addition/subtraction for all partial products obtained by multiplying each of the add/subtract terms of a power of 2 having a smallest term number in the decomposed constant by a signal. Accordingly, when a large scale integrated circuit having a number of constant multipliers is to be designed, each constant multiplier constituted of minimum elements according to the constant can be automatically provided. It can thus be understood that the present invention contributes a great deal toward reductions in areas occupied by the multipliers and the attainment of a high speed for processing in the large scale integrated circuit.

BRIEF DESCRIPTION OF THE DRAWINGS

This and other objects, features and advantages of the present invention will become more apparent upon a reading of the following detailed description and drawings, in which:

FIGS. 8(A) to 8(C) are views each illustrating the operation of the device of the embodiment based on a specific example;

DESCRIPTION OF THE PREFERRED EMBODIMENT

The preferred embodiment of the present invention will now be described with reference to the accompanying drawings.

Figure 1:
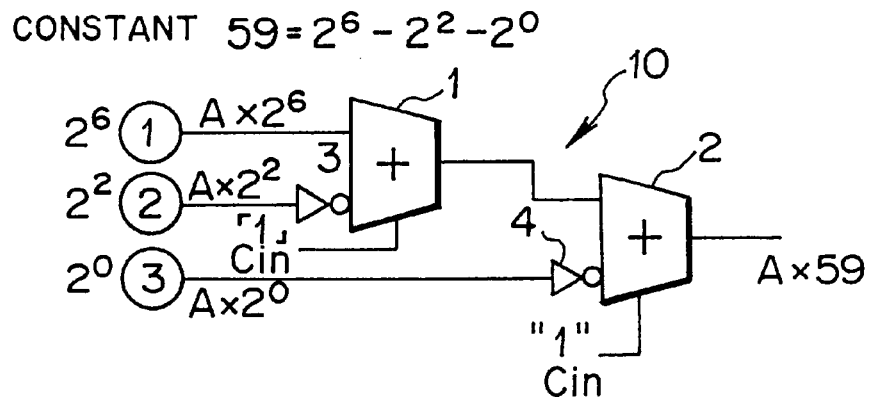
FIG. 1 is a constitutional view showing a constant multiplier of an embodiment of the present invention.

Referring to FIG. 1, there is shown a constitution of a constant multiplier according to an embodiment of the present invention.

The constant multiplier of the embodiment multiplies a constant I by a signal A set to an optional value. According to the present invention, the constant I as a multiplier is decomposed into the add/subtract terms of a power of 2 having a smallest number of terms and the constant multiplier is provided/designed according to its decomposed result.

For example, when the constant I is "59", the constant I is decomposed into the terms of a power of 2 like those described in the following expressions.

$$59 = 32 + 16 + 8 + 2 + 1 = 2^5 + 2^4 + 2^3 + 2^1 + 2^0 \qquad (1)$$

$$59 = 64 - 4 - 1 = 2^6 - 2^2 - 2^0 \qquad (2)$$

The numbers of terms are 5 for the expression (1) and 3 for the expression (2), respectively. The number is smaller for the expression (2) and as described later, when the constant 59 is decomposed into the add/subtract terms of a power of 2, the term number of 3 is a minimum term number.

Accordingly, as shown in FIG. 1, the constant multiplier 10 of the embodiment for multiplying the constant 59 by the signal A comprises an adding/subtracting circuit for performing addition/subtraction for all partial products $A \times 2^6$, $-A \times 2^2$ and $-A \times 2^0$ which are obtained by multiplying the terms $2^6$, $-2^2$, $-2^0$ of the add/subtract terms in the decomposed constant in the expression (2) each by the signal A.

Specifically, the constant multiplier 10 of the embodiment comprises two multiple input adders (CSA: Carry Save Adder) 1 and 2 and two inverters (inversion circuit) 3 and 4. The multiple input adder may simply be referred to as an adder, hereinafter.

The adder 1 adds together an input $A \times 2^6$ from an input terminal ①, a value (complement of $A \times 2^2$) obtained by inverting an input $A \times 2^2$ from an input terminal ② by the inverter 3 and a carry-in Cin "1" from a carry-in circuit (not shown), calculates "$A \times 2^6 - A \times 2^2$" and outputs its result.

The adder 2 adds together the calculation result of "$A \times 2^6 - A \times 2^2$" by the adder 1, a value (complement of $A \times 2^0$) obtained by inverting an input $A \times 2^0$ from an input terminal ③ by the inverter 4 and a carry-in Cin "1" from the carry-in circuit (not shown), calculates "$A \times 2^6 - A \times 2^2 - A \times 2^0 = A \times 59$" and then outputs this calculation result.

With the constant multiplier 10 of the embodiment constructed in the above-noted manner, the constant I=59 as a multiplier is decomposed into the add/subtract terms "$2^6 - 2^2 - 2^0$" of a power of 2 having a smallest term number and addition/subtraction is performed by the adders 1 and 2 and the inversion circuits 3 and 4 for all partial products obtained by multiplying each of the add/subtract terms by the signal A as a multiplicand. Thereby, a multiplication result between the constant 59 and the signal A is obtained.

Figure 11:
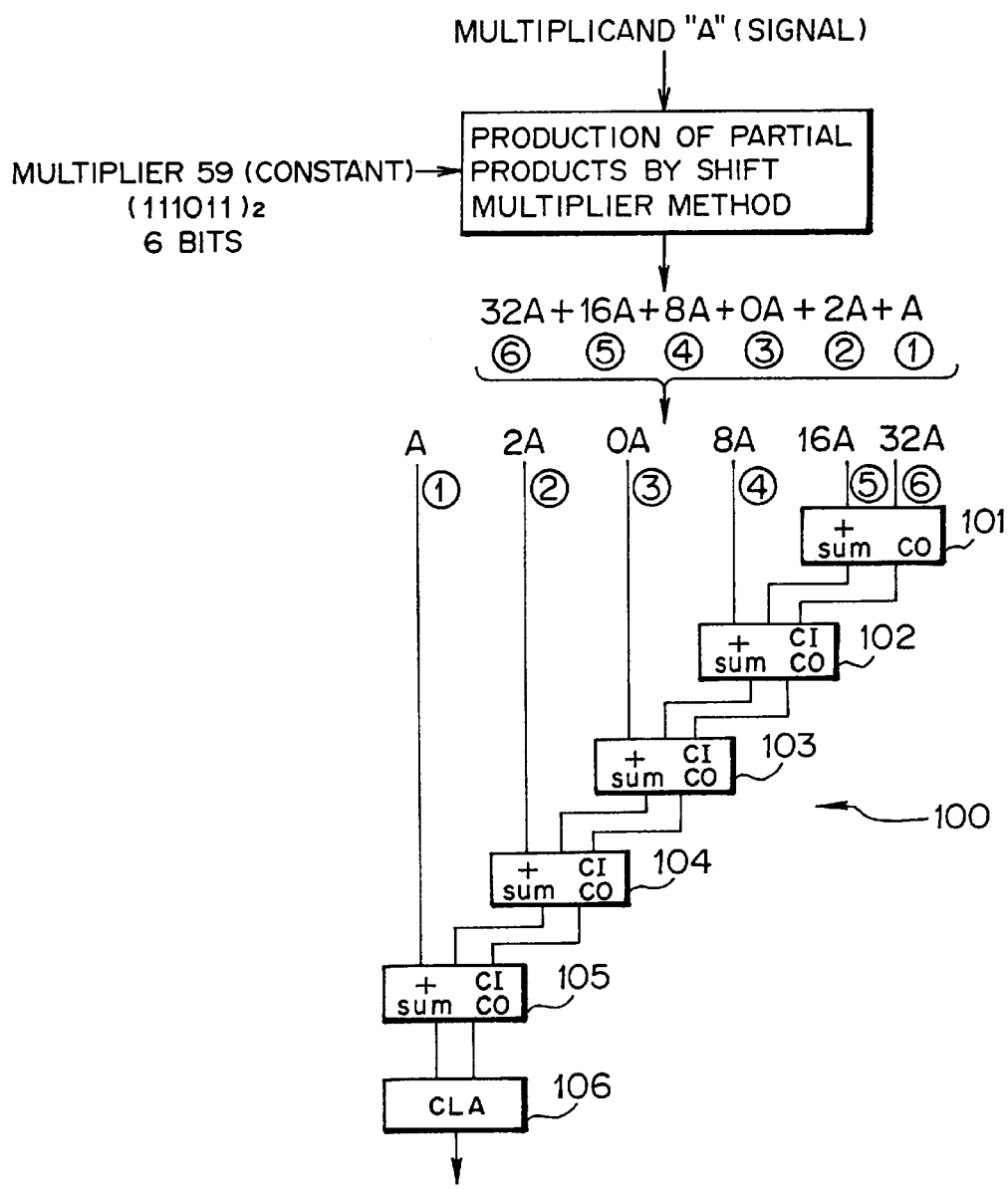
FIG. 11 is a view showing a multiplication processing procedure and a constitutional example of a multiplier which can multiply signals by each other when a constant is multiplied by a signal by the multiplier.
Figure 12:
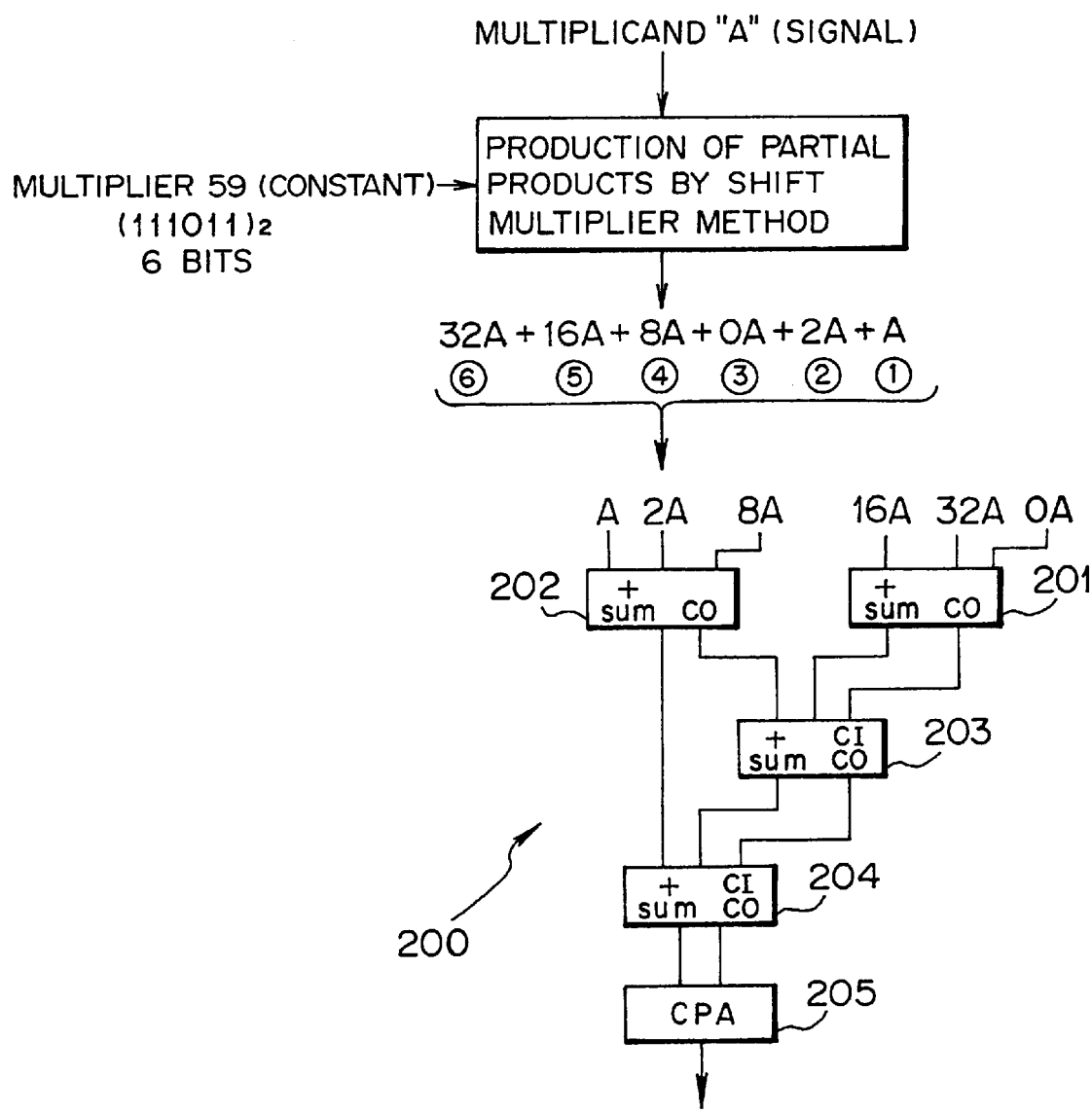
FIG. 12 is a view showing a designing procedure and a constitutional example of a constant multiplier which uses a "Wallace tree" form.

Therefore, the number of adding stages and the number of used adders can be reduced each to a minimum in the constant multiplier 10. When the constant is 59, in the example shown in FIG. 11, the number of partial products is 6, the number of adding stages is 5 and the number of used adders is 5. In the example shown in FIG. 12, the number of partial products is 5, the number of adding stages is 3 and the number of used adders is 4. In the case of the constant multiplier of the embodiment shown in FIG. 1, however, the number of partial products is 3, the number of adding stages is 2 and the number of used adders is 2. It can thus be understood that the present invention can greatly reduce the number of adding stages and the number of adders.

Figure 13:
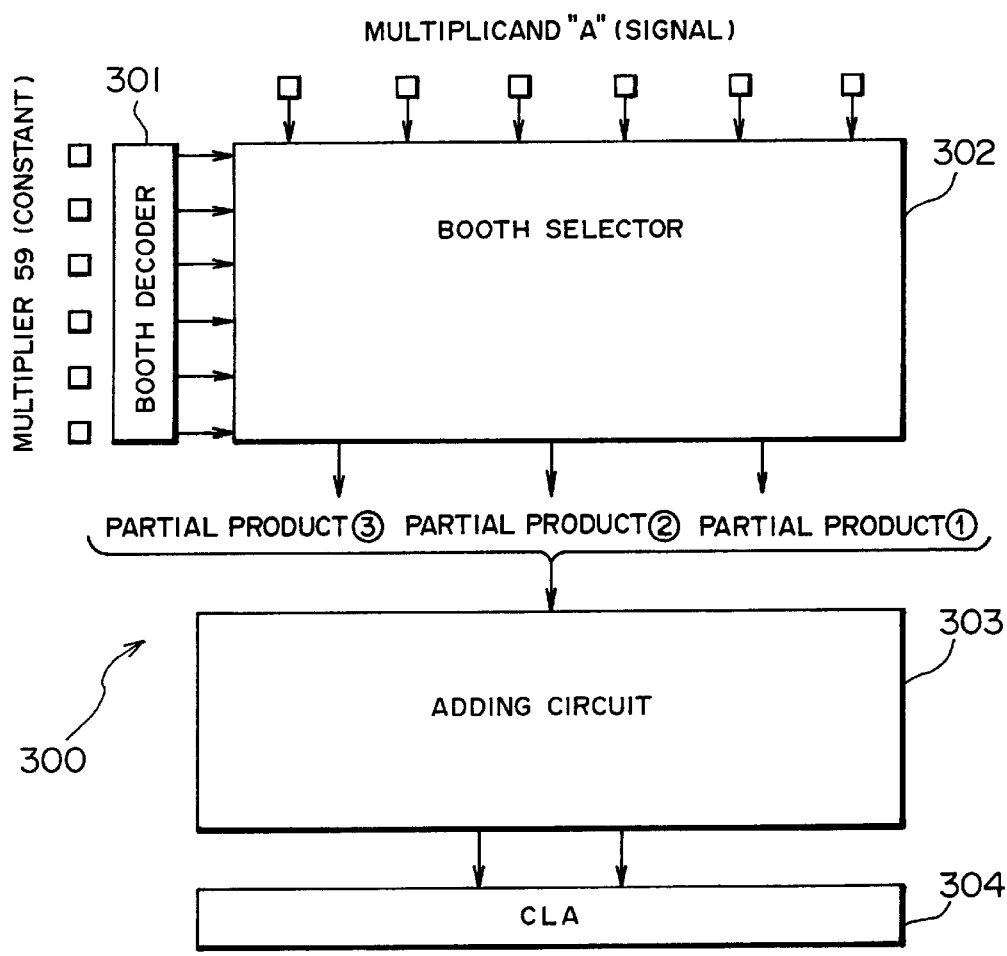
FIG. 13 is a block diagram showing a constitutional example of a multiplier having a partial product generation circuit which is composed of a booth decoder and a booth selector.

In addition, the constant multiplier 10 can be miniaturized and a high speed can be attained for processing. If a secondary booth method is used like that shown in FIG. 13, a multiplier can be constituted by setting the number of partial products to 3. However, this secondary booth method enables the number of partial products to be reduced only by half at the most. Moreover, in the case of a multiplier 300 constructed based on the secondary booth method, since a decoder 301 and a selector 302 must be provided for producing partial products, extra hardware is needed. Consequently, although operational delay is reduced in proportion to a reduction in the number of stages, area occupancy is inevitably increased more than that in the case of the constant multiplier 10 of the embodiment.

When a large size integrated circuit having a number of constant multipliers is to be designed, by constituting each constant multiplier of minimum elements according to the constant I to be multiplied as in the case of the constant multiplier 10 shown in FIG. 1, an area occupied by the multiplier can be greatly reduced in the large scale integrated circuit and operational delay can also be controlled therein. Thus, a high speed for processing can be attained.

The above-described expression (2) can be rewritten into another expression like the following expression (3).

$$59=64-(4+1)=2^6-(2^2+2^0) \tag{33}$$

Figure 2:
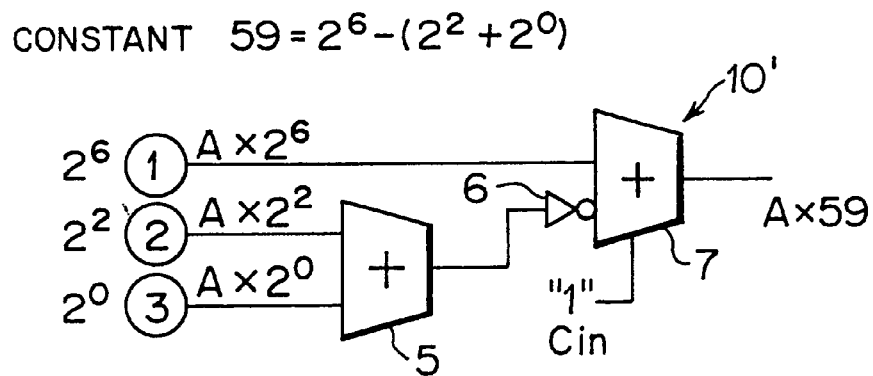
FIG. 2 is a constitutional view showing a modified example of the constant multiplier of the embodiment of the present invention.

Based on the expression (3), a constant multiplier 10' shown in FIG. 2 for multiplying the constant 59 by the signal A can be constructed.

Referring now to FIG. 2, there is shown a constitution of a modified example of the constant multiplier of the embodiment of the present invention. The constant multiplier 10' shown in FIG. 2 comprises a multiple input adder (CSA, first adding circuit) 5 for adding together all the absolute values $A \times 2^2$ and $A \times 2^0$ of partial products obtained by multiplying subtract terms included in add/subtract terms each by a signal, an inverter (inversion circuit) 6 for inverting a value added by the adder 5 and a multiple input adder (CSA, second adding circuit) 7 for adding together a value inverted by the inverter 6 and a partial product $A \times 2^6$ obtained by multiplying an add term included in the add/subtract terms by a signal.

Specifically, the adder 5 adds together an input $A \times 2^2$ from an input terminal ② and an input $A \times 2^0$ from an input terminal ③ and outputs the result of this addition. The adder 7 adds together an input $A \times 2^6$ from an input terminal ①, a value (complement of $A \times 2^2 + A \times 2^0$) obtained by inverting the calculation result of "$A \times 2^2 + A \times 2^0$" of the adder 5 by the inverter 6 and a carry-in Cin "1" from a carry-in circuit (not shown), then calculates "$A \times 2^6 - (A \times 2^2 + A \times 2^0) = A \times 59$" and outputs its result.

With the constant multiplier 10' having a circuitry like that described above, the number of inverters can be reduced by one compared with that of the constant multiplier 10 shown in FIG. 1 and a "1" clip element as the carry-in circuit can be omitted. Accordingly, the constant multiplier 10' can be miniaturized more than the constant multiplier 10.

In other words, since subtraction is performed by using the inverter 6 and the adder 7 after the subtract terms of the constant I are bracketed as shown in the expression (3) and the partial products (absolute values) in the bracket are added together by the adder 5, it is not necessary to provide a subtracting function ("1" clip element as the inverter or the carry-in circuit) for each subtract term. Accordingly, the multiplier can be further miniaturized and a processing speed can be increased.

Next, a device for automatically providing such constant multipliers 10 and 10' shown in FIGS. 1 and 2 will be described by referring to FIGS. 3 to 10.

Figure 3:
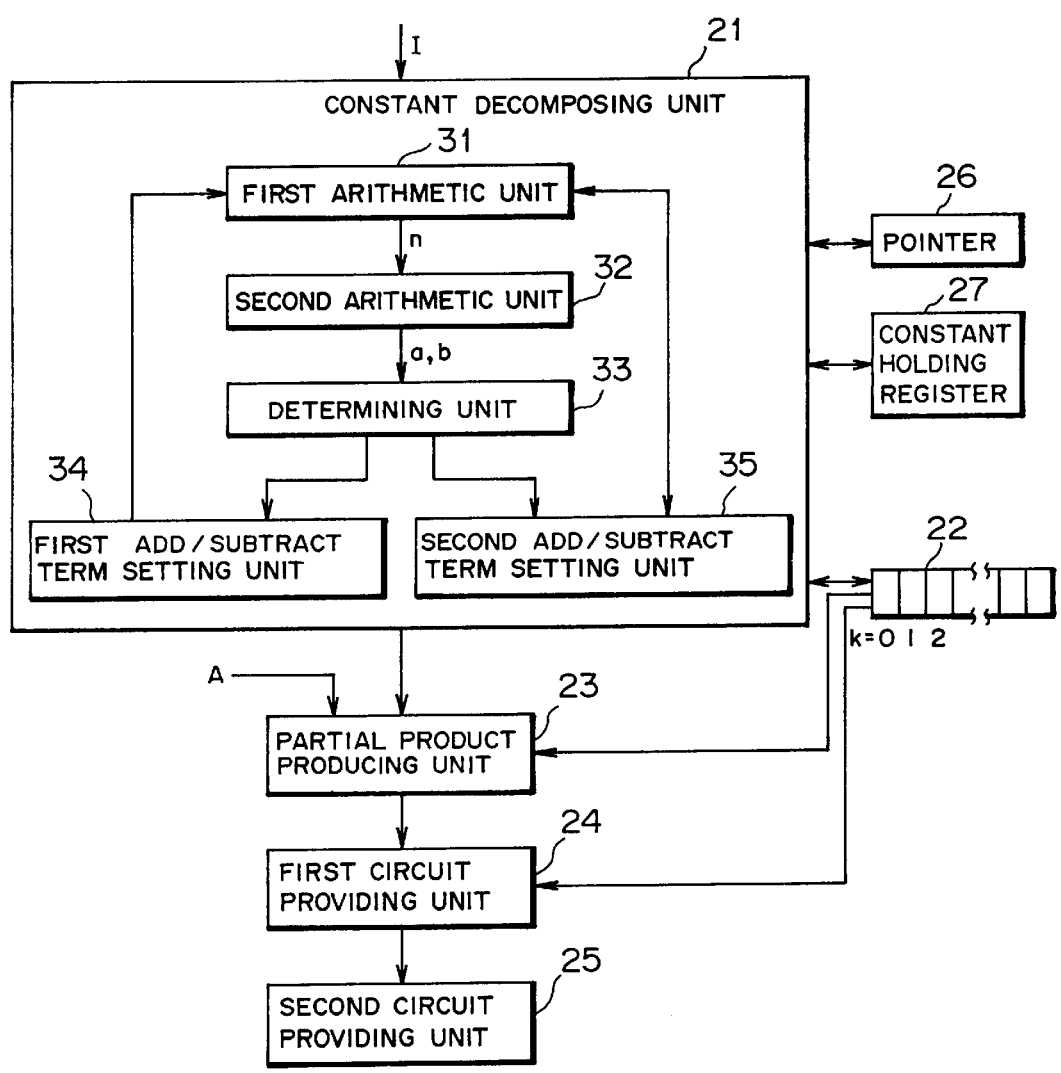
FIG. 3 is a block diagram showing a constitution of a constant multiplier automatic providing device of an embodiment of the present invention.

Referring first to FIG. 3, there is shown in block a constant multiplier automatic providing device of an embodiment of the present invention. The constant multiplier automatic providing device 20 of the embodiment is designed to automatically provide a constant multiplier for multiplying a constant I by a signal set to an optional value. In reality, the device provides such a multiplier by using a computer which includes a keyboard, a mouse, a display, a CPU, a ROM, a RAM, and so on. Specifically, in the computer, a constant multiplier automatic providing program stored in the storage medium of a hard disk, a magnetic tape, a floppy disk, an optical disk, a magneto-optical disk, a CD-ROM or the like is read and by executing this program a multiplier is provided. This constant multiplier automatic providing program causes the computer to function as constituting elements denoted by codes 21 and 23 to 25 shown in FIG. 3.

The constant multiplier automatic providing device 20 of the embodiment comprises a constant decomposing unit 21, a calculation result register 22, a partial product producing unit 23, a first circuit providing unit 24, a second circuit providing unit 25, a pointer 26 and a constant holding register 27. This device 20 is operated based on a flowchart (described later) shown in FIG. 4.

The constant decomposing unit (constant decomposing means) 21 decomposes a constant I into the add/subtract terms of a power of 2 having a smallest term number and sets its decomposed result (add/subtract terms) in the calculation result register 22 by referring to the pointer 26 for indicating the writing position of the calculation result register 22 and the constant holding register 27 for holding the constant I based on a flowchart (described later) shown in FIG. 5. The constant decomposing unit 21 includes first and second arithmetic units 31 and 32, a determining unit 33 and first and second add/subtract term setting units 34 and 35.

The first arithmetic unit (first calculating means) 31 calculates a natural number n satisfying $2^{n-1} < I < 2^n$ for the constant I held in the constant holding register 27.

The second arithmetic unit (second calculating means) 32 calculates natural numbers a and b satisfying expressions (4) and (5) described below based on the natural number n calculated by the first arithmetic unit 31. In the expressions, $a + b = 2^{n-1}$ is assumed.

$$I = 2^{n-1} + a \tag{4}$$

$$I = 2^n - b \tag{5}$$

The determining unit (determining means) 33 determines the relationship of size between the natural numbers a and b calculated by the second arithmetic unit 32.

The first add/subtract term setting unit (first add/subtract term setting means) 34 selects the expression (4) when the relationship of a<b is determined by the determining unit 33, sets $2^{n-1}$ in the specified position of the calculation result register 22 indicated by the pointer 26 and also adding/subtracting information (+/-; positive/negative information) regarding the current term $2^{n-1}$ in the specified position of the same according to adding/subtracting information (+/-; positive/negative information) regarding a previous term and then sets the natural number a as the constant I in the first arithmetic unit 31. In other words, the first add/subtract term setting unit 34 sets the natural number a as the constant I in the constant holding register 27.

The second add/subtract term setting unit (second add/subtract setting means) 35 selects the expression (5) when the relationship of a>b is determined by the determining unit 33, sets $2^n$ in the specified position of the calculation result register 22 indicated by the pointer 26 and also adding/subtracting information (+/−; positive/negative information) regarding the current term $2^n$ in the specified position of the same according to adding/subtracting information (+/−; positive/negative information) regarding a previous term and then sets the natural number b as the constant in the first arithmetic unit 31. In other words, the second add/subtract term setting unit 35 sets the natural number b as the constant I in the constant holding register 27.

Figure 5:
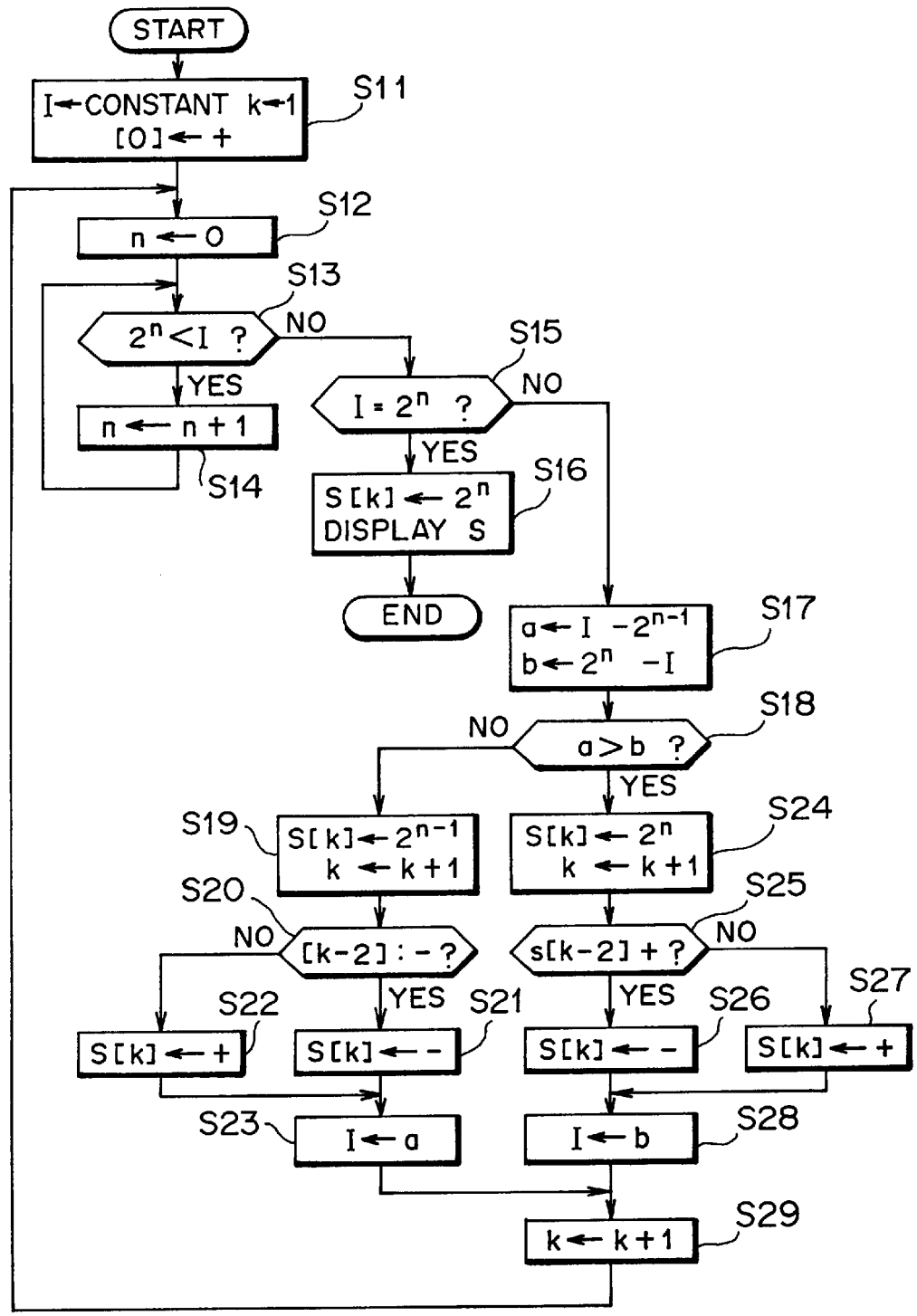
FIG. 5 is a flowchart illustrating a constant decomposing procedure of the device of the embodiment.

Then, as shown in the flowchart of FIG. 5, the constant decomposing unit 21 repeatedly executes processing each carried out by the first and second arithmetic units 31 and 32, the determining unit 33 and the first and second add/subtract term setting units 34 and 35 until the constant I in the first arithmetic unit 31 (i.e., constant I held in the constant holding register 27) becomes a power of 2.

The calculation result register 22 includes a plurality of segments S[k] indicated as k=0, 1, 2, ... , by the pointer 26. As described above, the pointer 26 indicates the positions (segments) of the calculation result register 22 for storing calculation results to the first and second add/subtract term setting units 34 and 35 in the constant decomposing unit 21. Accordingly, as described later by referring to FIG. 7, add/subtract terms (absolute values) calculated by the constant decomposing unit 21 and adding/subtracting information (+/−; positive/negative information) are held in each segment S[k] of the calculation result register 22.

The partial product producing unit (partial product producing means) 23 produces a partial product by multiplying each of the add/subtract terms stored in the calculation result register 22 by a signal.

The first circuit providing unit (circuit providing unit or circuit providing means) 24 provides an adding/subtracting circuit (partial product adding circuit) for performing addition/subtraction for all partial products obtained by the partial product producing unit 23.

This first circuit providing unit 24 is constructed to provide a first adding circuit (see the adder 5 shown in FIG. 2) for adding together all the absolute values of partial products obtained by multiplying subtract terms included in the add/subtract terms each by a signal, an inversion circuit (see the inverter 6 shown in FIG. 2) for inverting a value added by the first adding circuit and a second adding circuit (see the adder 7 shown in FIG. 2) for adding together a value inverted by the inversion circuit and partial products obtained by multiplying the add terms included in the add/subtract terms each by a signal. These elements are all provided as adding/subtracting circuits (partial product adding circuits) when a plurality of subtract terms exist in the add/subtract terms.

The second circuit providing unit (circuit providing unit or circuit providing means) 25 provides a last stage circuit such as a carry look-ahead adder (CLA), interconnects this last stage circuit and the adding/subtracting circuit (partial product adding circuit) provided by the first circuit providing unit 24 and thereby provides/outputs an end constant multiplier.

Figure 4:
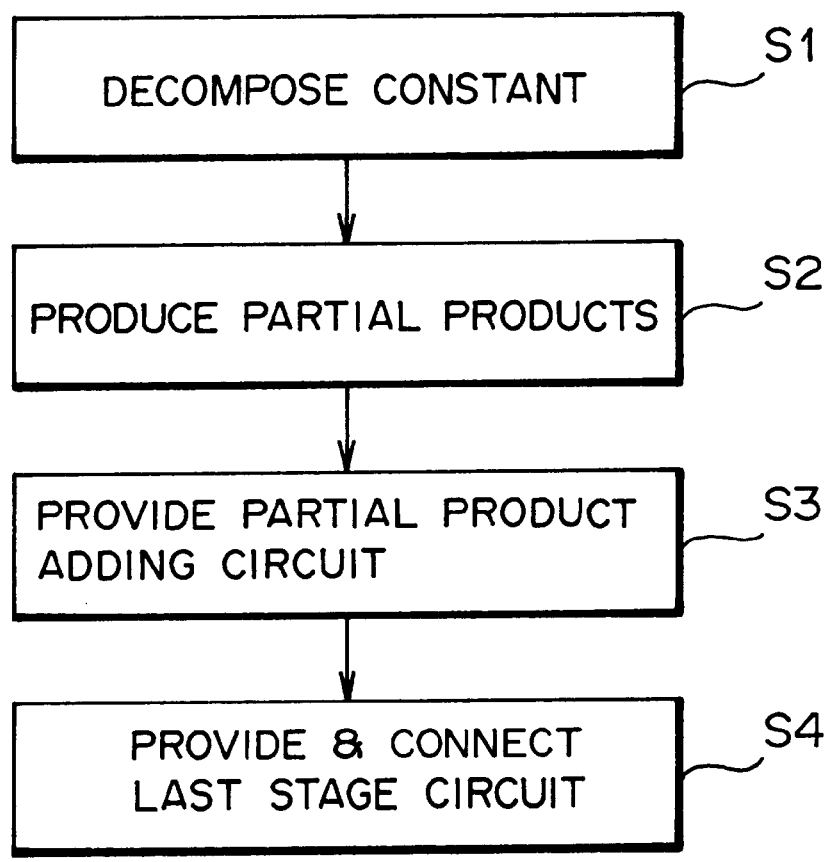
FIG. 4 is a flowchart illustrating the operation (constant multiplier automatic providing procedure) of the device of the embodiment.

Next, the operation of the constant multiplier automatic providing device 20 of the embodiment constructed in the manner described above with reference to FIG. 3 (constant multiplier automatic providing procedure) will be described by referring to the flowchart (including steps S1 to S4) shown in FIG. 4.

First, after the constant I as a multiplier has been inputted, the constant decomposing unit 21 decomposes the constant I into the add/subtract terms of a power of 2 according to the flowchart (described later) shown in FIG. 5 and then stores the result of this decomposing processing into the calculation result register 22 (constant decomposing step S1).

Then, by referring to the calculation result register 22, the partial product producing unit 23 produces a partial product by multiplying each of the add/subtract terms obtained in step S1 by a signal A (partial product producing step S2).

Thereafter, the first circuit providing unit 24 provides an adding/subtracting circuit (partial product adding circuit) for performing addition/subtraction for all partial products obtained in partial product producing step S2 (circuit providing step S3). The second circuit providing unit 25 provides a last stage circuit such as a CLA, connects the last stage circuit to the adding/subtracting circuit (partial product adding circuit) provided by the first circuit providing unit 24 and thereby provides/outputs an end constant multiplier (circuit providing step S4).

In circuit providing step S3, the adding/subtracting circuit may be constructed simply to add together the partial products from the partial product producing unit 23. Alternatively, this adding/subtracting circuit may be constructed so as to reduce the number of stages for adding together the partial products by using the above-noted "Wallace tree" or the CSA. In the embodiment, as described above, if a plurality of subtract terms exist in the add/subtract terms, the adding/subtracting circuit is provided by bracketing the subtract terms of the constant I.

Next, the procedure of a constant decomposing operation performed by the constant decomposing unit 21 of the embodiment will be described by referring to the flowchart (including steps S11 to S29) shown in FIG. 5.

First, the constant I to be multiplied is written in the constant holding register 27, 1 is written as a segment k indicated by the pointer 26 and "+" as code information (adding/subtracting information) regarding the constant I is written in S[0], that is, the segment k=0 of the calculation result register 22 (step S1).

Then, the first arithmetic unit 31 sets 0 as n (step S12), calculates $2^n$ and determines whether or not $2^n$ (n=0) is larger than the constant I which has been already written in the constant holding register 27 (step S13). If $2^n<I$ is determined (YES route from step S13), then 1 is added to n (step S14), $2^1, 2^2, 2^3, \ldots$ , are calculated in sequence and the resulted value of each calculation is compared with the constant I in step S13. If $2^n \leq I$ is determined (NO route from step S13), then the process proceeds to next step S15.

In step S15, determination is made as to whether the constant I is equal to $2^n$ or not. If equality between the constant I and $2^n$ is determined (YES route), $2^n$ is written in S[k] and then a calculation result (result of decomposition) written in S, that is, the calculation result register 22, is displayed on the display (step S16). Then, processing is finished.

In the embodiment, steps S12 to S15 function as a first step (first arithmetic unit 31) for obtaining the natural number n satisfying $2^{n-1}<I<2^n$ for the constant I.

On the other hand, if no equality between the constant I and $2^n$ is determined in step S15 (NO route), the second arithmetic unit 32 calculates natural numbers a and b which satisfy the above-noted expressions (4) and (5) (step S17, second step). Specifically, "$I-2^{n-1}$" is calculated for the natural number a and "$2^n-I$" is calculated for the natural number b.

Then, the determining unit 33 determines the relationship of size between the natural numbers a and b (step S18, third step).

If a<b is determined in step S18 (NO route), $2^{n-1}$ is written in S[k], that is, the segment k of the calculation result register 22, 1 is added to the value k of the pointer 26 (step S19) and then determination is made as to whether a code in the segment k−2 (S[k−2]) of the calculation result register 22 is "−" or not (step S20).

If "−" is determined (YES route), then a code "−" is written in the segment k (S[k]) of the calculation result register 22 (step S21). If "+" is determined on the other hand (NO route), then a code "+" is written in the segment k (S[k]) of the calculation result register 22 (step S22). Then, after the natural number a is written in the constant holding register 27 (step S23), 1 is added to the value k of the pointer 26 (step S29) and then the process returns to step S2.

In the embodiment, steps S19 to S23 function as a fourth step (first add/subtract term setting unit 34) for selecting the expression (4) and setting the natural number a as the constant I when the relationship of a<b is determined.

On the other hand, if a>b is determined in step S18 (YES route), then $2^n$ is written in the segment k (S[k]) of the calculation result register 22 and 1 is added to the value k of the pointer 26 (step S24). Then, determination is made as to whether a code in the segment k−2 (S[k−2]) of the calculation result register 22 is "+" or not (step S25).

If "+" is determined (YES route), a code "−" is written in the segment k (S[k]) of the calculation result register 22 (step S26). If "−" is determined (NO route), a code "+" is written in the segment k (S[k]) of the calculation result register 22 (step S27), and after the natural number b is written in the constant holding register 27 (step S28), 1 is added to the value k of the pointer 26 (step S29). Then, the process returns to step S2.

In the embodiment, steps S24 to S28 function as a fifth step (second add/subtract term setting unit 35) for selecting the expression (5) when the relationship of a>b is determined and setting the natural number b as the constant I.

In the above-description of the embodiment, no reference is made to the determination of a=b in step S18. If a=b is determined, two steps, S19 and S25, are available for processing. However, either one of these steps S19 or S25 should preferably be selected so as to cause a code to be "+" (in other words, so as to cause the decomposed terms to be add terms). This is for the reason that if the terms are subtract terms, an inverter and a carry-in circuit must be provided.

Next, the operation of the constant multiplier automatic providing device 20 of the embodiment when the constant I is, for instance 59[=$(111011)_2$], will be described more in detail by referring to FIGS. 5 to 7.

First, a procedure for decomposing the constant 59 into the add/subtract terms of a power of 2 having a smallest term number will be described by referring to FIGS. 5 and 6. In FIG. 6, the step numbers of FIG. 5 are added to segments in which code information or term information is written.

Figure 6:
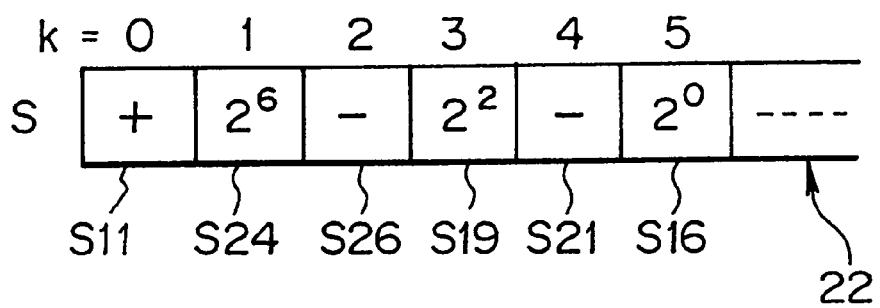
FIG. 6 is a view showing a specific example of information stored in a calculation result register of the embodiment.
Figure 7:
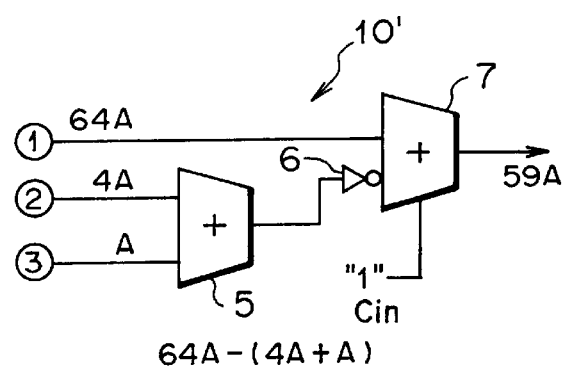
FIGS. 7(A) to 7(C) are views each illustrating the operation of the device of the embodiment based on a specific example.

In step S11, 59 as the constant I is written in the constant holding register 27, k=1 is written as an indication made by the pointer 26, and as shown in FIG. 6, code information "+" is written in the segment k=0 (S[0]) of the calculation result register 22.

Then, in step S12, n is set to 0. In step S13, $2^n$ is calculated and comparison is made so as to determine whether $2^n$ (n=0) is larger than the constant I=59 already written in the constant holding register 27 or not. If $2^n$ is smaller than 59, 1 is added to n in step S14 and then comparison is made again between $2^n$ and the constant I=59. This processing is repeatedly executed until n is set to 6, that is, $2^6$=64, and thus $2^6$<59 is not established (NO in step S13).

When $2^6$<I (=59) is not established because of $2^6$ in step S13, determination is made as to equality between $2^6$ and the constant I=59 in step S15. However, $2^6 \neq 59$ is easily determined because of I=59. Thus, in step S17, a natural number a (=I−$2^{n-1}$) and a natural number b (=$2^n$−I) are calculated. Herein, a=27 and b=5 are obtained because of I=59 and n=6.

Thereafter, determination is made as to whether a relationship is a>b or not in step S18. YES determination is naturally made because of a=27 and b=5. The process then proceeds to step S24. In step S24, as shown in FIG. 6, $2^n$, that is, $2^6$ is written in the segment k=1 (S[1]) of the calculation result register 22 and k=2 is obtained by adding 1 to a value k=1 indicated by the pointer 26.

Then, checking is made on whether the segment k−2, that is, S[0], of the calculation result register 22 is "+" or not in step S25. Since "+" is determined to have been written in the segment 0, the process proceeds to step S26. As shown in FIG. 6, in step S26, "−" is written in the segment k=2 (S[2]) of the calculation result register 22. Then, b=5 is written as a constant I in the constant holding register 27 and K=3 is obtained by adding 1 to a value k=2 indicated by the pointer 26. Then, the process returns to step S12.

During this period, the constant I=5 is written in the constant holding register 27 in step S28. Thus, since $2^n$<I ($2^3$<5) is not established with n=3 in step S13 and also because of $2^3 \neq 5$, the process proceeds to step S17 where a=1←5−$2^2$ and b=3←$2^3$−5 are calculated. Because of a 1 and b=3 and also since a>b is not established, the process proceeds from step S18 to step S19.

In step S19, as shown in FIG. 6, $2^{n-1}$, that is, $2^2$ is written in the segment k=3 (S[3]) of the calculation result register 22 and k=4 is obtained by adding 1 to a value k=3 indicated by the pointer 26.

Then, checking is made on whether the segment k−2, that is, S[2], of the calculation result register 22 is "−" or not in step S20. Since "−" is determined to have been written in the segment [2], the process proceeds to step S21. As shown in FIG. 6, in step S21, "−" is written in the segment k=4 (S[4]) of the calculation result register 22. Thereafter, a=1 is written as a constant I in the constant holding register 27 and k=5 is obtained by adding 1 to a value k=4 indicated by the pointer 26. Then, the process returns to step S12.

In this case, since the constant I held in the constant holding register 27 is 1, $2^n$<I ($2^0$<1) is not established with n=0 in step S13. Then, the process proceeds to step S15. Since I=$2^n$ ($2^0$=1) is determined in step S15, then in step S12, as shown in FIG. 6, $2^n$, that is, $2^0$ is written in the segment k=5 (S[5]) of the calculation result register 22.

Thus, the constant I=59 is expressed in the add/subtract terms of a power of 2 having a smallest term number and then the decomposing operation performed by the constant decomposing unit 21 is finished.

The constant decomposing unit 21 displays the contents of the calculation result register 22 shown in FIG. 6 on a display (not shown) so as to report the same to an operator. In this way, the constant can be decomposed into the add/subtract terms of a power of 2 having a smallest term number by optimizing the constant. Further, the subtract terms are bracketed so as to reduce the subtract terms included in the add/subtract terms obtained by decomposing and changed into add terms. Thus, a circuit can be provided/designed by using partial products each obtained by multiplication between a value obtained by decomposing and a corresponding signal.

Displaying of the contents of the calculation result register 22 on the display enables the operator to recognize 59=64−4−1 and design the constant multiplier 10 shown in FIG. 1 based on this recognition. Also, displaying of the expression 59=64−(4+1) in which the subtract terms are bracketed enables the operator to design the constant multiplier 10' shown in FIG. 2.

In the embodiment, processing for providing the constant multiplier 10 shown in FIG. 1 or the constant multiplier 10' shown in FIG. 2 based on the result of decomposing the constant I (=59) by the constant decomposing unit 21 is automatically performed by the partial product producing unit 23 and the first and second circuit providing units 24 and 25.

Specifically, by referring to the calculation result register 22, the partial product producing unit 23 produces three partial products 64A, −4A and −A by multiplying the add/subtract terms obtained by the constant decomposing unit 21 each by a signal A.

Then, the first circuit providing unit 24 provides an adding/subtracting circuit (partial product adding circuit) for performing addition/subtraction for all the partial products expressed in 64A−(4A+A), which were obtained by the partial product producing unit 23. The second circuit providing unit 25 provides a CPA such as a CLA, a carry select adder (CSA) or a ripple carry adder (RCA), as a last stage circuit. This last stage circuit and the adding/subtracting circuit (partial product adding circuit) provided by the first circuit providing unit 24 are connected to each other and thereby the end constant multiplier 10' (see FIG. 2) is provided/outputted.

In FIGS. 1 and 2, only the partial product adding circuit portions of the constant multipliers 10 and 10' are shown. In reality, however, a CPA such as a CLA, a CSA or an RCA is connected as a last state circuit to a stage subsequent to each of the adders 2 and 7.

Next, a specific circuitry example of the constant multiplier (constant multiplier 10' obtained with the constant I=59) of the embodiment will be described by referring to FIGS. 7(A) to 7(C). With the constant I=59, the relationship of 32<59<64 is obtained based on the algorithm shown in FIG. 5. Accordingly, the constant 59 can be decomposed into $32+27=2^5+a$ and alternatively $64-5=2^6-b$.

Because of 27>5, "$59=64-5=2^6-b$" is employed as a decomposing method and the constant I is set to 5. Similarly, because of 4<5<8, the constant 5 can be decomposed into $4+1=2^2+a$ and alternatively $8-3=2^3-b$. Because of 1<3, "$5=4+1=2^2+a$" is employed as a decomposing method. Then, because of $a=1=2^0$, the decomposing processing is finished and the result S of the decomposition stored in the calculation result register 22 is displayed. Then, the process proceeds to processing performed by the partial product producing unit 23.

As a result, S=64−4−1 is obtained. This is how the constant 59 is expressed in the add/subtract terms of a power of 2 having a smallest term number.

By bracketing the subtract terms so as to reduce the number of subtract terms, S=64−(4+1) is obtained. Generally, different from the case of an adder, a circuit for subtraction needs an element for clipping an inverter (inversion circuit) and a carry-in Cin by "1". Consequently, a circuit size is increased and operational delay is caused to occur. In the embodiment, by bracketing the subtract terms so as to reduce the number thereof, subtracting processing is changed into adding processing as much as possible and the number of elements and operational delay are reduced.

Thus, as shown in FIG. 7(A), when the signal A is 6 bits "a a a a a a", a multiplication value between the signal A and the constant 59=(111011)$_2$ can be calculated by adding together the partial products of three stages. Further, by changing subtracting processing into adding processing as shown in FIG. 7(B), a constant multiplier 10' (identical to that shown in FIG. 2) as an adding/subtracting circuit for calculating 64A−(4+A) can be automatically provided as shown in FIG. 7(C).

If a binary number is used, the constant 59 can be expressed in 6 bits of (111011)$_2$ as described above. If the signal A as a multiplicand is 6 bits (a a a a a a ), in the case of the conventional system, a multiplier is constituted with a signal (6 bit-width)×a signal (6 bit-width). In other words, since multiplication between the constant 59 and the signal A is performed in a manner shown in FIG. 14(A), the number of stages for partial products is 6.

Figures 14A, 14B, 14C, 14D:
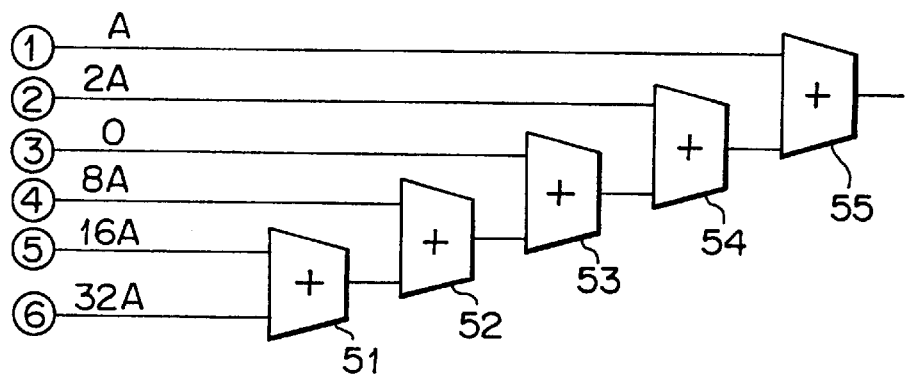
FIGS. 14(A) to 14(D) are views each illustrating a conventional multiplication processing procedure and a conventional multiplier constitution based on a specific example.

This multiplication is expressed by partial products ①  to ⑥ shown in FIG. 14(B). Then, as shown in FIG. 14(C), the multiplier is composed of five adders 51 to 55 for adding together these six partial products and an operation is performed based on a numerical expression like that shown in FIG. 14(D). As described above, in the case of the conventional system, the number of partial products is 6, the number of adding stages is 5 and the number of used adders is also 5.

On the other hand, in the constant multiplier 10' of the embodiment for multiplying the constant 59 by a signal, as shown in FIGS. 2 and 7(C), the number of partial products is 3, the number of adding stages is 2 and the number of used adders is 2. It is obvious that the number of adding stages and the number of used adders can be greatly reduced.

It can thus be understood that by using the constant number automatic providing device 20 of the embodiment, a constant multiplier 10' which is compact and performs processing at a high speed can be automatically provided. Accordingly, when a large size integrated circuit having a number of constant multipliers is to be designed, each constant multiplier can be automatically constituted of minimum elements according to a constant I to be multiplied like the constant multiplier 10' shown in FIGS. 2 and 7(C). As described above, areas occupied by such multiplies in the large size integrated circuit can be greatly reduced and operational delay therein can be controlled. As a result, high processing speed can be attained.

Another specific circuitry example of the constant multiplier (constant I=59) of the embodiment will be described by referring to FIGS. 8(A) to 8(C). First by referring to FIG. 8(A), a constant multiplier (see FIG. 9) constructed by expressing partial products ① 64A, ②−4A and ③−A as complements of 2 and adding these complements together will be described.

If all the partial products obtained by constant decomposing processing are positive values, a product can be simply obtained by directly adding together all the partial products. However, if the partial products include at least one partial product having a negative value, the value is inverted and expressed as a complement of 2 by adding "1" to an LSB (least significant bit).

Figures 8A, 8B, 8C:
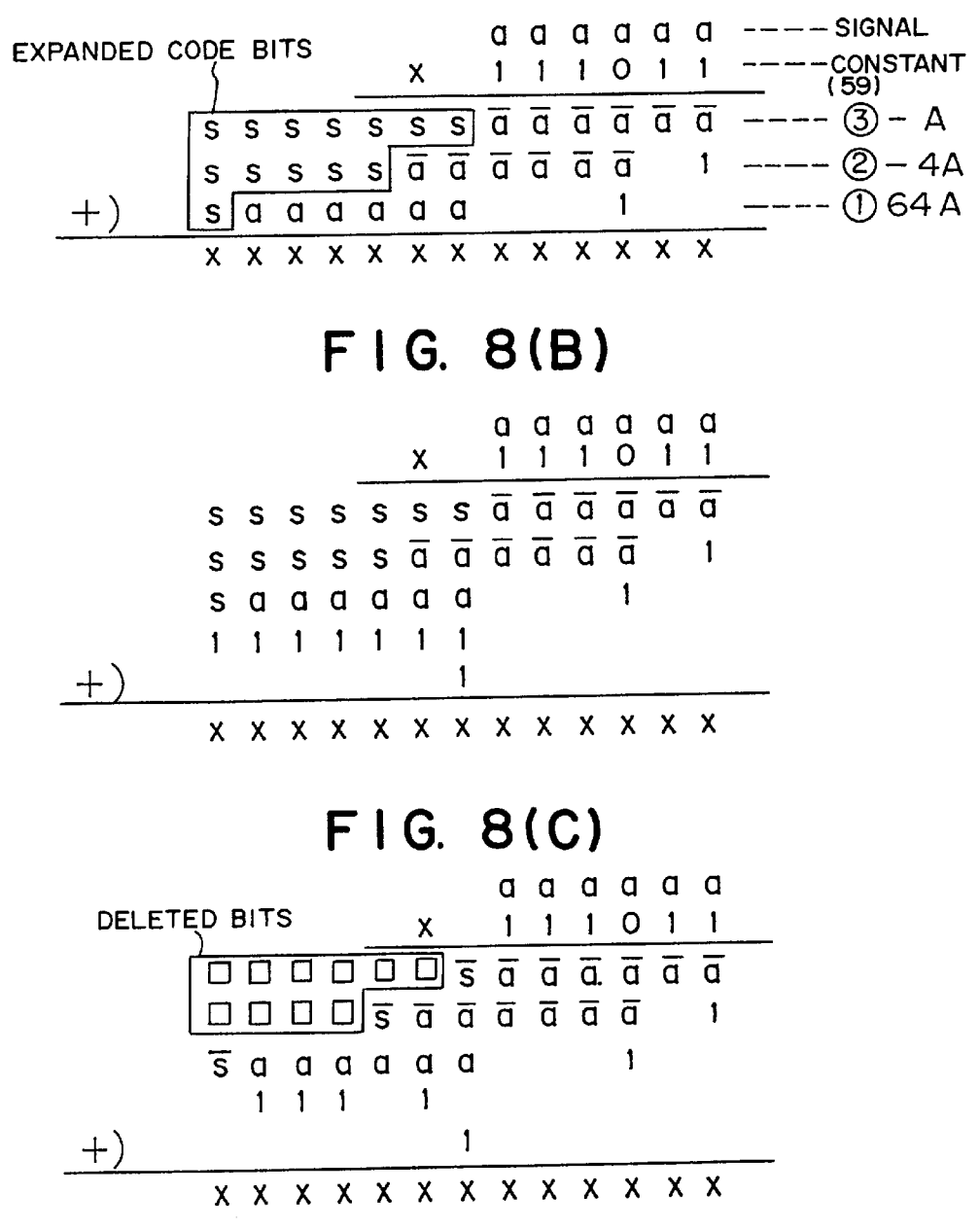

More particularly, as shown in FIG. 8(A), the partial products are added together in sequence from the product having a smallest absolute value [(−A)+(−4A)+64A]. The negative values −A and −4A are inverted and code bits s for these values are expanded, a code bit s for the value 64A is expanded only by 1 bit and bits are added for adding "1" to the LSB of each of the inverted partial products. In FIGS. 8(A) to 8(C) and FIG. 9, the inverted values of respective bits (totally 6 bits) "a" and a code bit "s" of the signal A are expressed by placing bars "−" above "a" and "s".

However, since such code expansion brings about an increase in hardware, a code non-expansion correction arithmetic means available in the prior art is employed so as to make code expansion unnecessary. Specifically, "1" is added to a position (equivalent to 7 bits) corresponding to the code bit "s" and also "1" is added to the LSB of the code. Thus, only by adding "0" after all, no problem is caused to occur.

Most of the code bits are eliminated by processing shown in FIG. 8(B) and the sum total of the partial products (−A)+(−4A)+64A=59 obtained at the end is expressed by an expression like that shown in FIG. 8(C).

Figure 9:
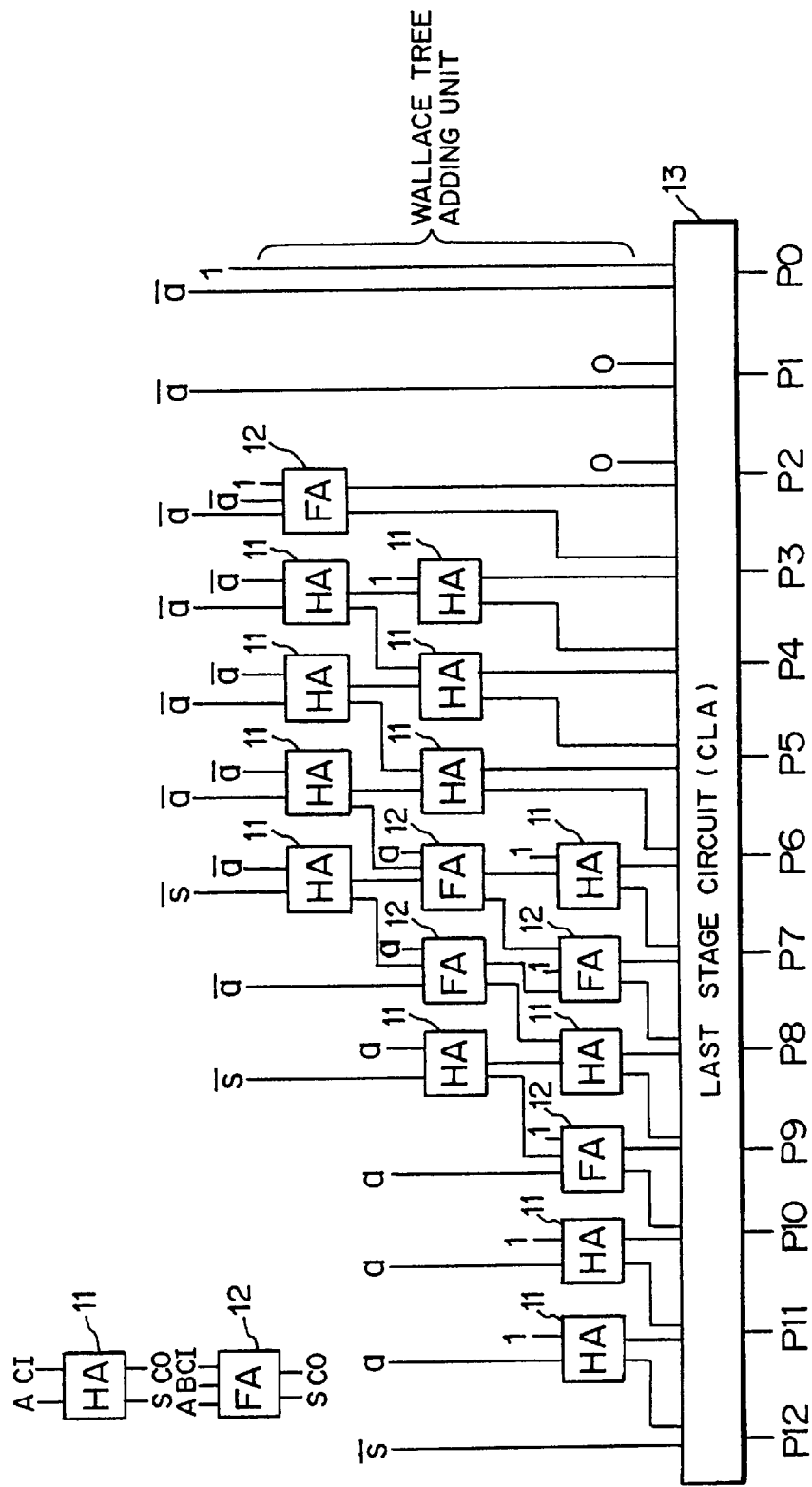
FIG. 9 is a circuit diagram showing a specific example of a constant multiplier of the embodiment provided based on the operations of FIGS. 8(A) to 8(C)

Based on the expression like that shown in FIG. 8(C), a constant multiplier like that shown in FIG. 9 can be provided. In FIG. 9. a code 11 denotes an half adder (HA), a code 12 a full adder (FA) and a code 13 a last state circuit (CLA or the like).

Next, a reason for the use of the expression (5) rather than the expression (4) for decomposition of the constant I when a>b is determined in step S18 shown in FIG. 15 will be described.

The reason is that with a>b, expressing costs are smaller when the constant I is decomposed based on the expression (5) compared with that based on the expression (4). Next, a reason for smaller expressing costs for the use of the expression (5) will be described.

Expressing costs are decided based on an order which is proportional to the number of "1" included in a binary number when a certain numeral is expressed by the binary number. For example, since a numeral 3 is $2^1+2^0=(11)_2$, the number of "1" is 2. Since a numeral 8 is $2^3=(100)_2$, the number of "1" is 1.

If the constant I is eliminated by using the expressions (4) and (5), the following expression (6) is established.

$$a+b=2^{n-1} \quad (6)$$

Then, if m=n−1 holds true, the expression (6) becomes a+b=$2^m$ and with a>b the following expression (7) is established.

$$2^{m-1} < a < 2^m \quad (7)$$

From the expressions (4) and (5), the following two expressions (8) and (9) are available each as the simplest way of expressing a natural number a. Herein, a' and a" are both natural numbers.

$$a=2^{m-1}+a' \quad (8)$$

$$a=2^m-a'' \quad (9)$$

From the expressions (8) and (9), expressing costs for the natural number a are calculated based on the following expressions (10) and (11).

| [expressing costs of a'] + [expressing costs of $2^{m-1}$] ....... (10) |
| [expressing costs of a"] + [expressing costs of $2^m$] ....... (11) |

It can be understood that expressing costs for the natural number a are always more than those for the natural numbers a' and a" by 1 ($2^{m-1}$ or $2^m$).

If the expression (8) is selected, since the relationship of b=$2^m$−a=$2^m$−($2^{m-1}$+a')=($2^m$−$2^{m-1}$)−a'=$2^{m-1}$−a' holds true, expressing costs for a natural number b are calculated based on the following expression (12).

| [expressing costs of b] |
| = [expressing costs of $2^{m-1}$] + [expressing cost of a'] |
| = 1 + [expressing costs of a'] |
| = [expressing costs of a] ....... (12) |

If the expression (9) is selected, the relationship of b=$2^m$−a=$2^m$−($2^m$−a")−a" holds true.

Since costs for expressing the natural numbers a' and a" are always smaller by 1 than costs for expressing the natural number a, costs for expressing the natural number b are equal to or lower than the expressing costs for the natural number a. Accordingly, [expressing costs of a]>[expressing costs of b] is realized. With a>b, the expressing (5) is selected. With a<b, the expression (4) is selected for a similar reason. With a=b, expressing costs between the natural numbers a and b are equal to each other.

For the above-described reason, if the condition of a>b is satisfied, the decomposing method based on the expression (5) is selected and the natural number b is set as a constant I. If the condition of a>b is not satisfied, the decomposing method based on the expression (4) is selected and the natural number a is set as a constant I. Accordingly, by repeating processing shown in FIG. 5 until the constant I becomes equal to $2^n$, the constant I can be decomposed into the add/subtract terms of a power of 2 having a smallest term number.

In the above-description of the embodiment, reference was made only to the case that the constant I was set to 59. The constant I is not limited to such a value, and when any of the other values is selected for the constant I, the value can be applied to the above-described embodiment and effects similar to those obtained by the embodiment can be obtained.

The constant multiplier 10 and 10' of the embodiment shown in FIGS. 1 and 2 are constructed by connecting CPAs, for instance CLAs, as last stage circuits to the stages next to the two-stage CSAs 1 and 2, and 5 and 7 respectively. However, if the number of bits is small, the two-stage adders can be provided as CPAs and thereby the last stage circuits can be omitted. Also, the first stage can be used for a CSA and the second for a CLA.

Figure 10:
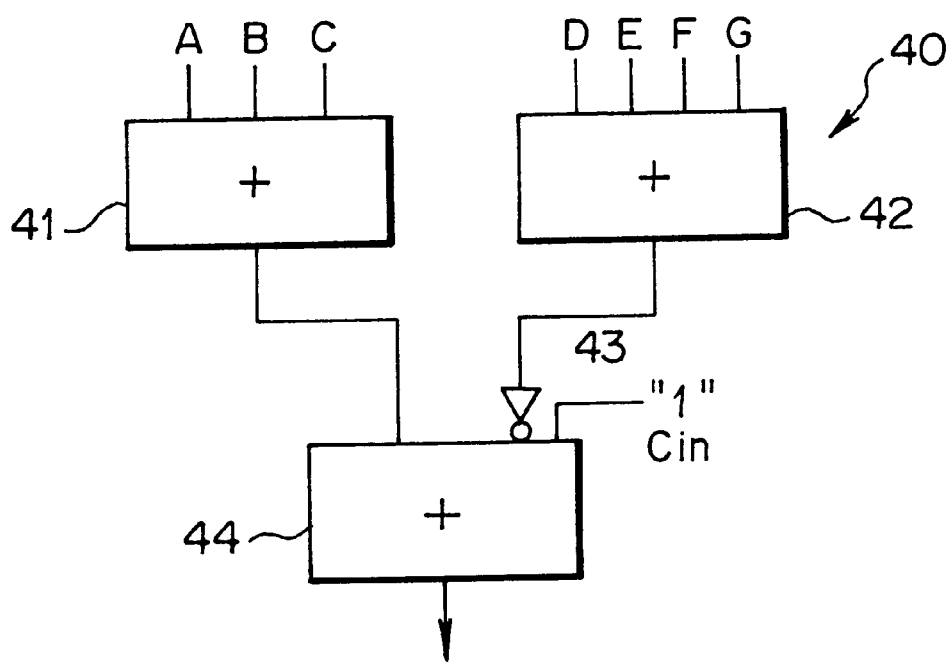
FIG. 10 is a view showing another example of a constant multiplier provided by the device of the embodiment.

Furthermore, if A, B and C as add terms and −D, −E and −F as subtract terms are obtained by the partial product producing unit 23, for instance as shown in FIG. 10, a constant multiplier 40 composed of multiple input adders 41, 42 and 44 and an inverter (inversion circuit) 43 can be provided by the circuit providing units 24 and 25.

In this case, the multiple input adder 41 calculates the sum total of the add terms A, B and C. The multiple input adder (first adding circuit) 42 calculates the sum total of the absolute values D, E, F and G of the subtract terms. The inverter 43 inverts a value from the multiple input adder 42.

The multiple input adder (second adding circuit) 44 adds together a value from the multiple input adder 41, an inverted value from the inverter 43 and a carry-in Cin "1" from a carry-in circuit (not shown) and thereby calculates the sum total of partial products, that is, a multiplication result between a constant and a signal, and outputs this result.

In the above-description of the embodiment, reference was made to the case of decomposing the constant I based on the procedure shown in FIG. 5. However, the present invention is not limited to such a procedure and any other methods can be used for decomposing of the constant I as long as the methods can decompose the constant I into the add/subtract terms of a power of 2.

It should be understood that the present invention is not limited to the above-described embodiments and various changes and modifications may be made without departing from the spirit of the invention or the scope of the appended claims.

What is claimed is:

1. A constant multiplier for multiplying a signal which is to be input as a multiplicand having an arbitrary value, by a given multiplier constant, said constant multiplier comprising:

a constant decomposing section for decomposing the multiplier constant into a minimum number of add and/or subtract terms that are each expressed as an n-th power of 2, where each number n is a natural number different from that of each other add and/or subtract term;

a partial product producing section for producing such minimum number of terms of positive and/or negative partial products by multiplying the multiplicand by each and every one of the add and/or subtract terms of the multiplier constant which are obtained by said constant decomposing section; and partial product adding means in a minimum-stage adding circuit structure for adding together all the minimum number of terms of positive and/or negative partial products.

2. A constant multiplier as claimed in claim 1, wherein said partial product adding means comprises:

a first adding circuit for adding together all absolute values of the negative partial products obtained by said partial product producing section;

an inversion circuit for inverting a resultant negative value, which is obtained from said first adding circuit as the result of adding all absolute values of the negative partial products, into a positive value; and a second adding circuit for adding together the positive value of all of the negative partial products, which is obtained by said inversion circuit and the values of all of the positive partial products.

3. An automatic constant multiplier providing method for automatically providing a constant multiplier for multiplying a signal, which is to be input as a multiplicand, by a given multiplier constant I, said method comprising the steps of:

(a) decomposing the multiplier constant I into a minimum number of add and/or subtract terms that are each expressed as an n-th power of 2, where each number n is a natural number different from that of each other add and/or subtract term;

(b) producing such minimum number of terms of positive and/or negative partial products by multiplying the multiplicand by each and every one of the add and/or subtract terms of the multiplier constant I; and (c) providing an addition/subtraction circuit for adding together all the minimum number of terms of positive and/or negative partial products, which are obtained in the step (b) above, in a minimum number of adding stages.

4. An automatic constant multiplier providing method as claimed in claim 3, wherein said decomposing step comprises:

(I) obtaining a natural number n satisfying an inequality $2^{n-1} < I < 2^n$ for the multiplier constant I;

(II) obtaining natural numbers a and b satisfying both a first equation $I = 2^{n-1} + a$ and a second equation $I = 2^n - b$ based on said natural number n obtained in the step (I) above;

(III) determining whether a relationship of size between the natural numbers a and b obtained in the step (II) above is a<b or a>b;

(IV) selecting the first equation if a<b in the step (III) above and then setting the natural number a as the multiplier constant I in the step (I) above; and (V) selecting the second equation if a>b in the step (III) above and then setting the natural number b as the multiplier constant I in the step (I) above;

the steps (I) through (V) above being repeated until the multiplier constant I in the step (I) becomes an optimum power of 2.

5. An automatic constant multiplier providing method as claimed in claim 3, wherein said adding/subtracting circuit provided in the step (c) above comprises:

a first adding circuit for adding together all absolute values of the negative partial products obtained in the step (b) above;

an inversion circuit for inverting a resultant negative value, which is obtained by said first adding circuit, into a positive value; and a second adding circuit for adding together the positive value of all of the negative partial products, which is obtained by said inversion circuit, and the values of all of the positive partial products obtained in the step (b) above.

6. An automatic constant multiplier providing method as claimed in claim 4, wherein said adding/subtracting circuit provided in the step (c) above comprises:

a first adding circuit for adding together all absolute values of the negative partial products obtained in the step (b) above;

an inversion circuit for inverting a resultant negative value, which is obtained by said first adding circuit, into a positive value; and a second adding circuit for adding together the positive value of all of the negative partial products, which is obtained by said inversion circuit, and the values of all of the positive partial products obtained in the step (b) above.

7. An automatic constant multiplier providing device for automatically providing a constant multiplier for multiplying a signal, which is to be input as a multiplicand, by a given multiplier constant I, said device comprising:

a multiplier constant decomposing unit for decomposing the multiplier constant I into a minimum number of add and/or subtract terms that are each expressed as an n-th power of 2, where each number n is a natural number different from that of each other add and/or subtract term;

a register for storing the minimum number of add and/or subtract terms obtained by said multiplier constant decomposing unit;

a partial product producing unit for producing such minimum number of terms of positive and/or negative partial products by multiplying the multiplicand by each and every one of the add and/or subtract terms of the multiplier constant I, which are stored in said register; and a circuit providing unit for providing an addition/subtraction circuit for adding together all the minimum number of terms of positive and/or negative partial products, which are obtained by said partial product providing unit, in a minimum number of stages of addition.

8. An automatic constant multiplier providing device as claimed in claim 7, wherein said multiplier constant decomposing unit comprises:

a first arithmetic unit for calculating the natural number n such as to satisfying an inequality $2^{n-1}<I<2^n$ for the multiplier constant I;

a second arithmetic unit for calculating natural numbers a and b satisfying both a first equation $I=2^{n-1}+a$ and a second equation $I=2^n-b$ based on said natural number n obtained by said first arithmetic unit;

a determining unit for determining whether a relationship of size between the natural numbers a and b, which are calculated by said second arithmetic unit, is a<b or a>b;

a first add/subtract term setting unit for selecting the first equation if a<b, then setting $2^{n-1}$ in said register and also adding/subtracting information regarding a current term 2n-1 in said register according to adding/subtracting information regarding a preceding term, and then setting the natural number a as the multiplier constant I in said first arithmetic unit; and a second add/subtract term setting unit for selecting the first equation if a>b, then setting $2^n$ in said register and also adding/subtracting information regarding current term $2^n$ in said register according to adding/subtracting information regarding a preceding term, and then setting the natural number b as the multiplier constant I in said first arithmetic unit;

said first and second arithmetic units, said determining unit, and said first and second add/subtract term setting units being adapted to repeatedly execute their respective operations until the multiplier constant I in said first arithmetic unit becomes an optimum power of 2.

9. An automatic constant multiplier providing device as claimed in claim 8, wherein said adding/subtracting circuit provided by said circuit providing unit comprises:

a first adding circuit for adding together all absolute values of the negative partial products obtained by said partial product producing unit;

an inversion circuit for inverting a resultant negative value, which is obtained by said first adding circuit, into a positive value; and a second adding circuit for adding together the positive value of all of the negative partial products, which is obtained by said inversion circuit, and the values of all of the positive partial products obtained by said partial product producing unit.

10. An automatic constant multiplier providing device as claimed in claim 7, wherein said adding/subtracting circuit provided by said circuit providing unit comprises:

a first adding circuit for adding together all absolute values of the negative partial products obtained by said partial product producing unit;

an inversion circuit for inverting a resultant negative value, which is obtained by said first adding circuit, into a positive value; and a second adding circuit for adding together the positive value of all of the negative partial products, which is obtained by said inversion circuit, and the values of all of the positive partial products obtained by said partial product producing unit.

* * * * *